(12) United States Patent
James et al.

(10) Patent No.: US 10,240,693 B2
(45) Date of Patent: Mar. 26, 2019

(54) DETACHABLE PIPE RACK MODULE WITH DETACHABLE CONNECTORS FOR USE IN A PROCESSING FACILITY

(71) Applicants: Kenneth George James, Calgary (CA); Bob Nabata, Calgary (CA)

(72) Inventors: Kenneth George James, Calgary (CA); Bob Nabata, Calgary (CA)

(73) Assignee: Private Equity Oak LP, Alberta (CA)

( * ) Notice: Subject to any disclaimer, the term of this patent is extended or adjusted under 35 U.S.C. 154(b) by 129 days.

(21) Appl. No.: 14/617,394

(22) Filed: Feb. 9, 2015

(65) Prior Publication Data
US 2015/0226353 A1    Aug. 13, 2015

Related U.S. Application Data

(60) Provisional application No. 61/937,228, filed on Feb. 7, 2014.

(51) Int. Cl.
*F16L 3/22* (2006.01)

(52) U.S. Cl.
CPC ........... *F16L 3/22* (2013.01); *Y10T 137/0402* (2015.04)

(58) Field of Classification Search
USPC ......... 211/70.4, 41.15; 138/106; 248/49, 56, 248/57
See application file for complete search history.

(56) References Cited

U.S. PATENT DOCUMENTS

| 3,489,274 | A | * | 1/1970 | Overton | B65D 71/0096 206/391 |
| 3,945,497 | A | * | 3/1976 | Greenberg | B65D 61/00 211/70.4 |
| 4,199,070 | A | * | 4/1980 | Magnussen, Jr. | A47B 63/02 138/112 |
| 4,706,822 | A | * | 11/1987 | Remp, Jr. | B65D 85/20 206/443 |
| 4,826,113 | A | * | 5/1989 | Winters | F16L 3/18 248/228.3 |
| 5,433,322 | A | * | 7/1995 | Williams | A47B 87/0207 206/443 |
| 5,499,480 | A | | 3/1996 | Bass | |

(Continued)

OTHER PUBLICATIONS

Meyer, William; Modularization, Aug. 15, 2007; Foster Wheeler brochure, pp. 28-30, available at: http://www.houbrt.com/2005/documents/modularizationpresentationforhbr.pdf.*

*Primary Examiner* — Craig M Schneider
*Assistant Examiner* — David R Deal
(74) *Attorney, Agent, or Firm* — Fay Sharpe LLP

(57) ABSTRACT

A method of building a fluids processing facility includes arranging a first level of modules, each module having a longitudinal axis and each containing at least one first pipe in a substantially adjacent and parallel orientation. A pipe rack module is arranged on a second higher level, such that a longitudinal axis of the pipe rack module is oriented in a direction that is substantially normal to the longitudinal axes of the first level of modules. The pipe rack module includes at least one second pipe. The at least one first pipe of each of the first level of modules is connected with each other via the at least one second pipe disposed in the pipe rack module to form a processing facility. Also disclosed is a pipe rack module which connects several piping modules in a fluids processing facility to each other.

20 Claims, 13 Drawing Sheets

(56) References Cited

U.S. PATENT DOCUMENTS

| | | | | |
|---|---|---|---|---|
| 5,860,627 A * | 1/1999 | Edwards | ............... | B65D 85/20 |
| | | | | 248/68.1 |
| 5,924,577 A * | 7/1999 | Gessert | ............... | A47B 81/00 |
| | | | | 211/162 |
| 6,182,837 B1 * | 2/2001 | Crabtree | ............... | B65D 81/05 |
| | | | | 206/443 |
| 6,422,405 B1 * | 7/2002 | Haenszel | ............... | A47B 45/00 |
| | | | | 108/55.1 |
| 7,647,976 B2 * | 1/2010 | Tsilevich | ........... | E21B 43/2406 |
| | | | | 166/272.3 |
| 7,802,526 B2 * | 9/2010 | Brady | ............... | B65D 19/12 |
| | | | | 108/53.5 |
| 7,997,541 B2 * | 8/2011 | Pothanikat | ........... | F16L 59/135 |
| | | | | 248/560 |
| 8,347,580 B2 | 1/2013 | Beeche | | |
| 2012/0193093 A1 * | 8/2012 | James | ............... | E21B 43/2406 |
| | | | | 166/267 |
| 2014/0158651 A1 * | 6/2014 | Behrens | ............... | E21B 19/14 |
| | | | | 211/70.4 |

* cited by examiner

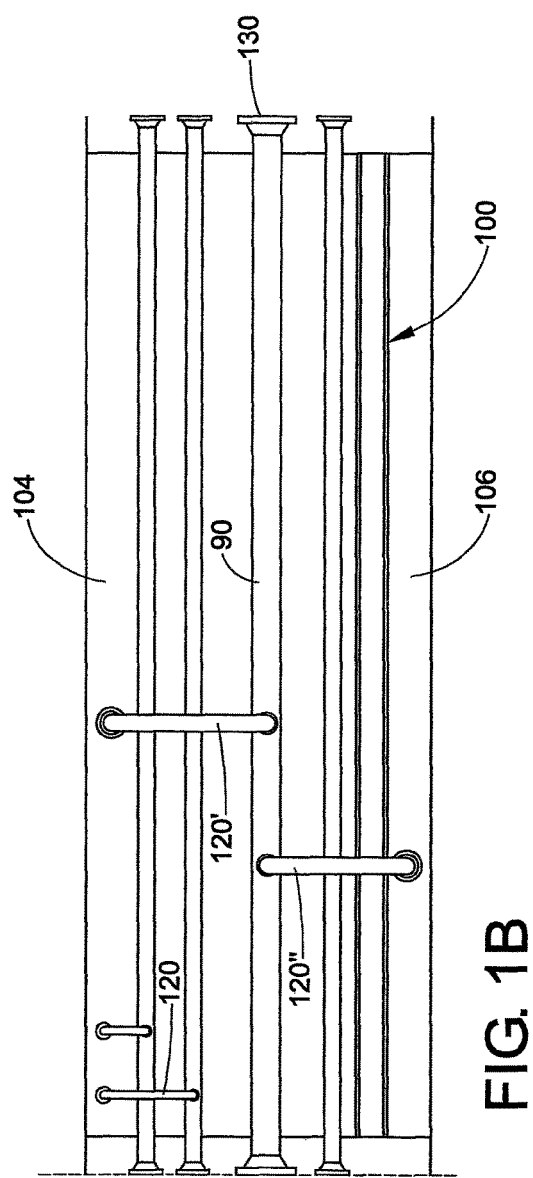
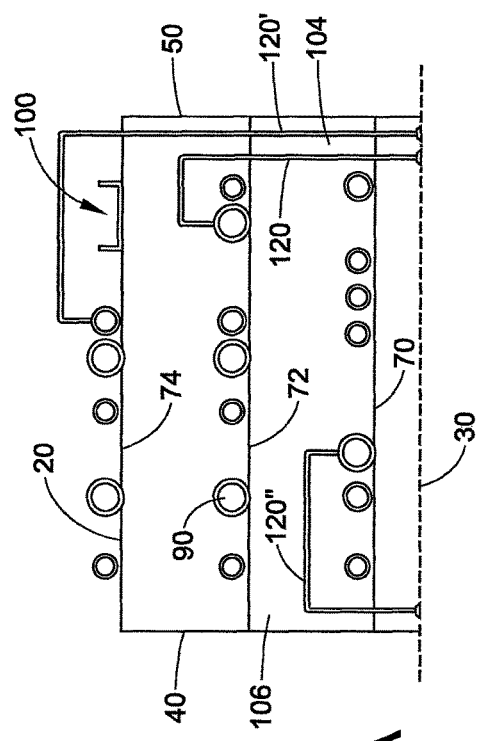

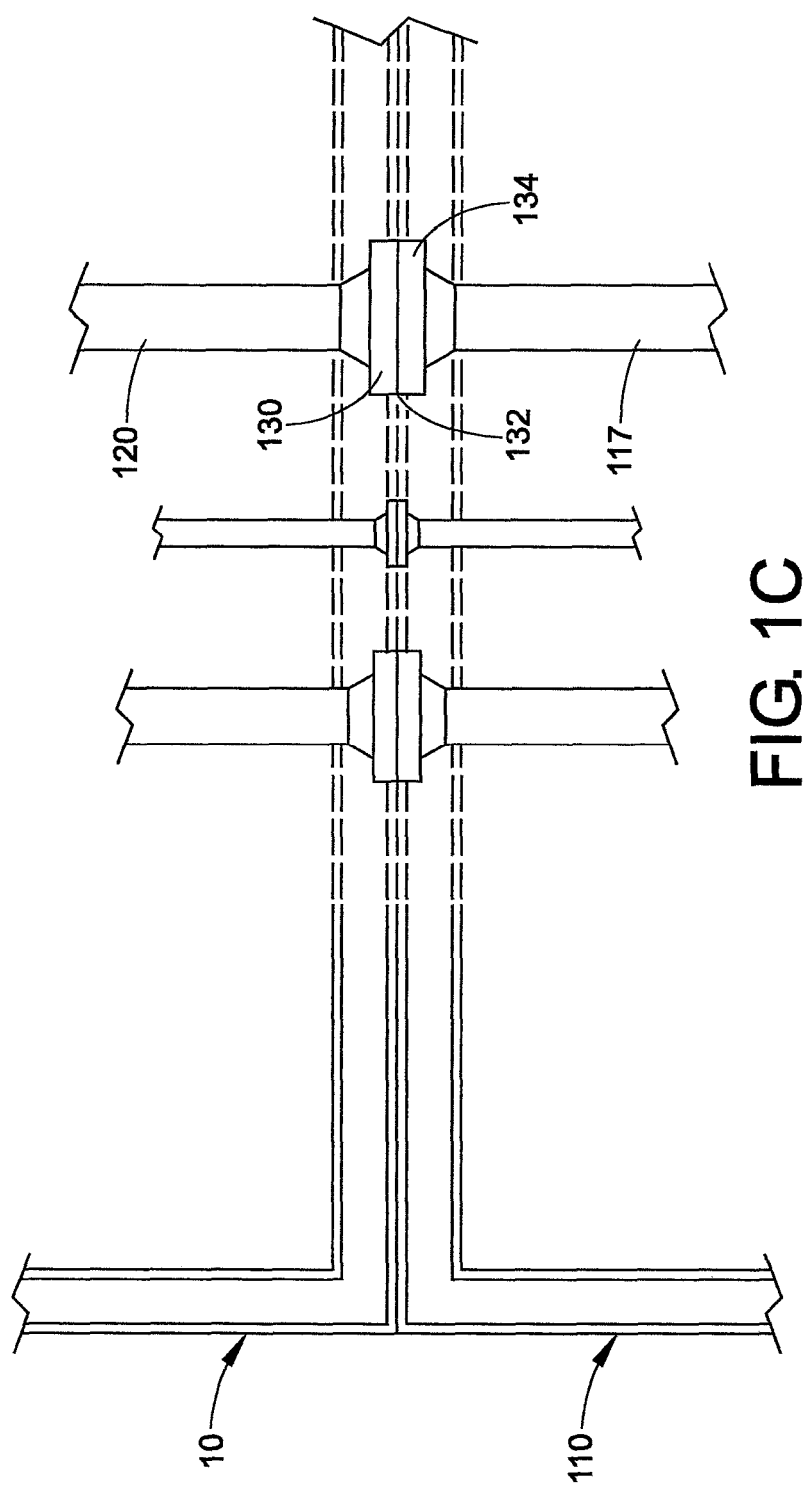

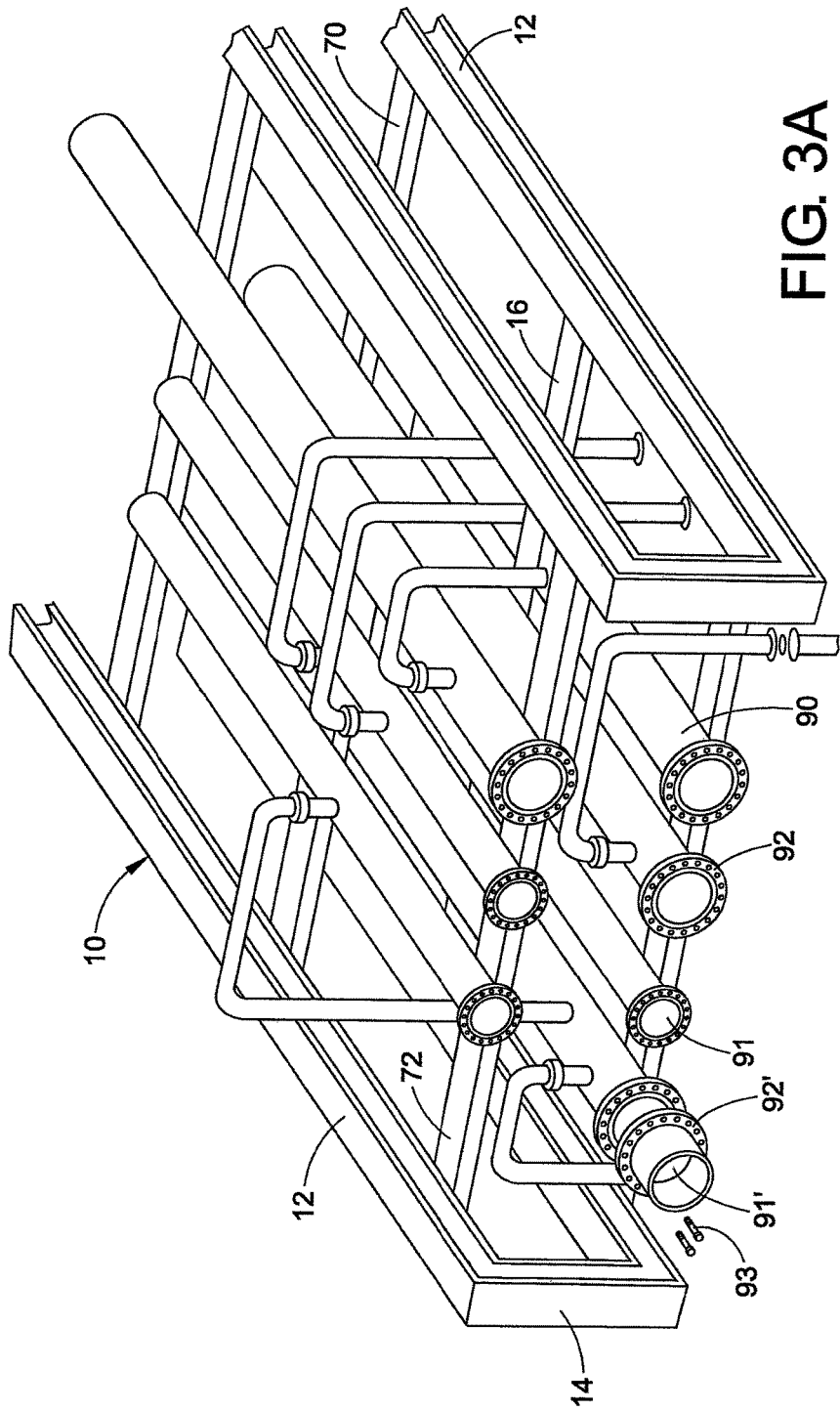

DETACHABLE PIPE RACK MODULE WITH DETACHABLE CONNECTORS FOR USE IN A PROCESSING FACILITY

PRIORITY

This application claims the benefit of Provisional Application Ser. No. 61/937,228 which was filed on Feb. 7, 2014. The entire content of that application is incorporated hereinto by reference.

BACKGROUND

This disclosure relates to a quick connect pipe rack module for use in a multi-module processing facility that may be quickly assembled and/or dismantled reducing site construction costs and increasing efficient relocation of the modules.

As the cost of large site fabricated process facilities has climbed, the industry has adopted modular construction as a means of shifting large volumes of construction labor to more efficient fabrication centers.

An oil processing facility typically is made up of a number of modules requiring multiple complex permanent connections that must be made in the field requiring significant amounts of field work in making the connections in environmental conditions that at times are severe. Furthermore, these modular facilities are not designed to be dismantled and relocated at some point in their service life, but rather are designed for use in the original construction site until the end of their service life.

Current modular construction and assembly strategy of modular processing facilities are not intended to be reversible and have not resulted in capital cost reductions that were targeted.

Despite the efficiency gains through modular construction, capital projects have experienced unprecedented escalation. Concurrently, companies have continually increased the capacity of processing facilities in pursuit of economies of scale, resulting in increased disproportionate complexity to modular construction (higher capacity increases the number of modules and often results in multiple trains of equipment to fit within individual modules). This modular construction strategy leaves a substantial amount of work to be conducted in the field as well as limits the achievable economies of scale.

By increasing the amount of work that may be completed in manufacturing facilities distant from the oil processing site, economies of scale may be achieved by constructing numerous modules of the same design. Mass production efficiency gains may result in capital cost savings even when scale of equipment and facilities increase, allowing design capacity to be tailored to suit specific needs.

For many complex processing facilities, it is not uncommon at some point in their operating life that market conditions, feedstock constraints or other socio-economic pressures may render these facilities uneconomic, at which point it would be advantageous to be able to efficiently relocate such facilities to a location that would restore economic viability.

For example, natural gas based petrochemical facilities constructed in North America in the early 1980s took advantage of plentiful inexpensive natural gas. As natural gas costs rose in the early 2000s, these facilities were shut down and dismantled. Had the facilities been designed to be portable, the facilities could have been efficiently relocated to places where inexpensive natural gas was abundant such as the Middle East, where new facilities were constructed during this period. A few years later, the shale gas boom resulted in the long-term collapse of North American natural gas prices, providing an opportunity to relocate facilities from abroad back to North America.

Portability may also reduce inefficient field work which increases cost savings. In addition, portability may also provide flexibility such that the facilities may be well utilized through their full life cycle.

Portability may also reduce impact on the environment by reducing the facility footprint, reducing human intrusion (construction labor, temporary facilities and accommodations, infrastructure) into environmentally sensitive areas, and facilitating faster and lower cost site remediation.

BRIEF SUMMARY

According to one embodiment of the present disclosure, there is provided a pipe rack module which is adapted to be connected to and disconnected from at least one associated equipment module that is located in a fluids processing facility. The pipe rack module comprises a substantially rectangular elongated frame having a longitudinal axis and including a plurality of connected framing members comprising horizontally oriented framing members which extend parallel to the longitudinal axis of the elongated frame, uprights, and cross-braces which extend normal to the longitudinal axis of the elongated frame, the plurality of framing members together defining a top surface, a bottom surface, a first side surface, a second side surface and wherein the frame has a height, a width and a length. A pipe support is defined by the frame, the pipe support comprising the cross braces of the frame. A plurality of spaced primary pipes are supported on the pipe support, wherein the plurality of primary pipes extend in a direction parallel to the longitudinal axis of the elongated frame. A first passage is defined between the first side surface of the frame and the nearest adjacent pipe. A second passage is defined between the second side surface of the frame and the nearest adjacent pipe. At least one connector pipe comprises a first end and a second end. The first end of the at least one connector pipe is connected to an upper surface of one of the plurality of primary pipes and a second end of the connector pipe, which terminates at the bottom surface of the frame, comprises a flange adapted for connection to an associated pipe.

In accordance with another aspect of the present disclosure, there is provided a method for building a processing facility. The method comprises arranging a first level of modules, each having a longitudinal axis and each containing at least one first pipe, in a substantially adjacent and parallel orientation. A pipe rack module is arranged on a second higher level, such that a longitudinal axis of the pipe rack module is oriented in a direction that is substantially normal to the longitudinal axes of the first level of modules. The pipe rack module includes at least one second pipe. The at least one first pipe of each of the first level of modules is connected with each other via the at least one second pipe disposed in the pipe rack module, thereby forming a processing facility.

BRIEF DESCRIPTION OF THE FIGURES

FIG. 1A is a schematic end view of a pipe rack module according to one embodiment of the present disclosure;

FIG. 1B is a schematic top view of the pipe rack module of FIG. 1A;

FIG. 1C is a greatly enlarged side elevational view of a pipe rack module being connected to a lower module according to one embodiment of the present disclosure;

FIG. 3A is an enlarged view of one end portion of the module of FIG. 3;

DETAILED DESCRIPTION

Figure 3:
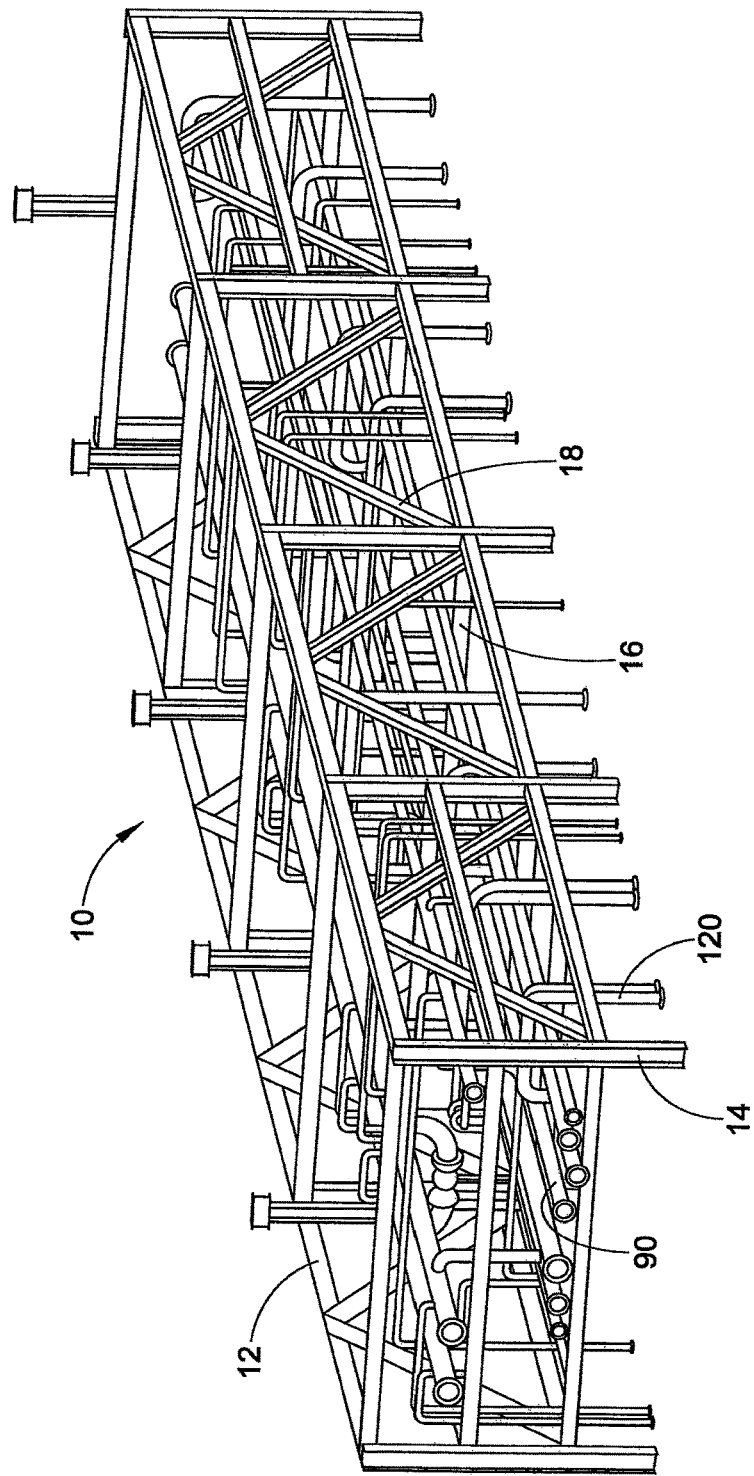
FIG. 3 is a perspective view of a pipe rack module according to the present disclosure.

Referring now to FIG. 1A and 3, there is depicted a pipe rack module 10 in the form of a three-dimensional frame which includes a plurality of beam-like members. In one embodiment, the frame constitutes an open framework comprising beam-like members which include horizontally oriented beam members 12 that extend along a longitudinal axis of the pipe rack module 10, uprights 14 which are disposed in a vertical orientation and connect adjacent horizontally oriented beams or framing members to each other and cross braces 16 which are disposed in a horizontal orientation and in a direction which is normal to the longitudinal axes of the horizontally oriented beam members and which serve to connect the horizontally oriented beam members located on opposed sides of the frame to each other. Also provided are diagonally oriented bracing members 18 which extend between and are connected to vertically spaced ones of the horizontally oriented beam members 12. It should be appreciated that a plurality of such cross braces can be provided as is illustrated in FIG. 1A and as is also illustrated in the embodiment of FIG. 3. In one embodiment, the pipe rack module 10 can be 14 feet in height, 14 feet in width and 65 feet in length. Such a pipe rack module is designed to be carried by the trailer of a semi-trailer truck, also known as a transport, a semi, an articulated lorry or a "big rig." In another embodiment, the pipe rack module can be 24 feet in height, 24 feet in width and 110 feet in length.

The plurality of beam-like members cooperate to define a volume including a top surface 20, a bottom surface 30, a first side surface 40 and a second side surface 50 of the pipe rack module. In this embodiment, the module 10 has three pipe support levels or racks 70, 72 and 74, each carrying a plurality of pipes 90, which can be termed primary pipes, of varying sizes. In one embodiment, the pipes can have a diameter of 1 inch. In another embodiment, the pipes can have a larger diameter such as 2 inches or the like, or any other desirable diameter as may be needed for piping installations in a fluids processing facility, such as an oil processing facility. One example of same is a heavy oil processing facility. The top rack 74 can support a tray 100 for holding instrumentation and electrical wiring. It should be apparent that such a cable tray can be located on any desired level of the pipe rack module 10.

Figure 2:
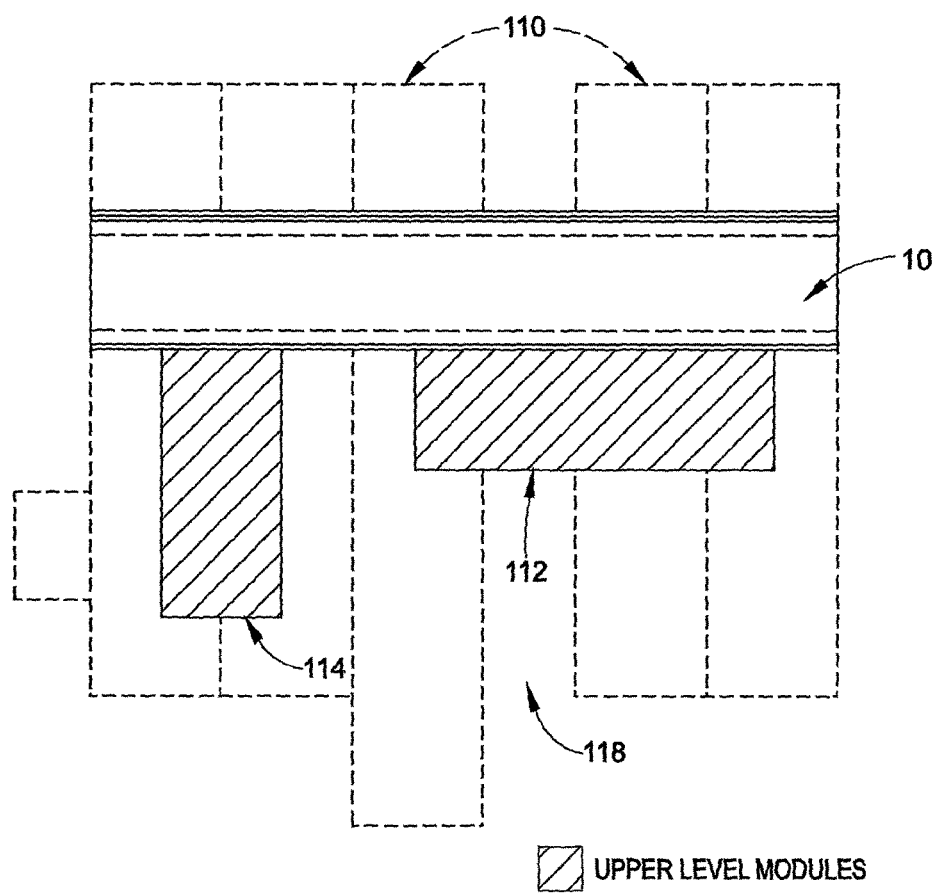
FIG. 2 is a reduced schematic overhead view of the pipe rack module of FIG. 1A as overlying a plurality of lower modules, the pipe rack module being oriented transverse to the orientation of the lower modules.

The pipe rack module 10 sits atop one or more lower modules 110 (lower module 110 is an example of multiple lower modules which are oriented in a direction perpendicular to the orientation of the module 10, as can be seen in FIG. 2). The module 10 includes in this embodiment a pair of spaced alleyways 104, 106 located on the two opposed sides of the module 10. The first alleyway 104 is defined by the space between the first side surface 40 of the module 10 and the nearest adjacent pipe 90. The second alleyway 106 is defined by the space between the second side surface 50 of the module and the nearest adjacent pipe 90. Each alleyway 104, 106 serves for communication from the module 10 to one or more lower modules 110. In one embodiment, the smaller size pipe rack module (14'×14'×65') can connect up to twelve lower modules 110. Needless to say, a larger sized pipe rack module could connect even more of the lower modules 110, whereas a smaller sized pipe rack module would connect a lesser number of the lower modules. It is important to note that most, if not all, communication or interconnection between the lower modules 110 takes place via the one or more pipes contained in the pipe rack module 10.

As best seen in FIG. 2, in one embodiment, the pipe rack module 10 sits or is oriented normal to or perpendicular to the orientation of the longitudinal axes of the lower modules 110 located in a fluids processing facility. If there are upper modules located at the same level or a level above the pipe rack module, those upper modules, such as modules 112 and 114 illustrated in FIG. 2, those modules do not extend over or cross over the pipe rack module 10. Rather, they are located to one or another side of the pipe rack module 10. Thus, it can be seen from FIG. 2 that a first upper level module 112 is oriented parallel to the longitudinal axis of the pipe rack module 10, but is located on one side thereof, whereas a second upper level module 114 is oriented normal to the longitudinal axis of the pipe rack module and is aligned with the orientations of the lower level modules 110. Both module 112 and module 114 have one surface in direct contact with the pipe rack module to facilitate connection to the pipe rack module.

Referring now to FIG. 3, the module 10 in one embodiment includes two pipe levels which each support a plurality of horizontally extending pipes 90. With reference now also to FIG. 3A, each end 91 of the several pipes 90 includes a respective flange 92 for detachable connection of the respective pipe to a pipe 90' located on an adjacent module (not shown). Pipe 90' also has a flange 92' at a pipe end 91' for detachable connection to the flange 92 of the pipe 90. In this embodiment, flanges 92 and 92' are detachably connected via known detachable connectors or fasteners 93. It should be appreciated that one or more pipe rack modules 10 can be connected horizontally to each other in this way for a larger size fluids processing facility. The ends of the pipes contained or held on each such pipe rack module would be connected as illustrated in FIG. 3A.

In one embodiment, the several pipes 90 are each of the same length as the pipe rack module 10 itself. Thus, for a 65 foot long pipe rack module, each of the pipes 90 would also be roughly 65 feet in length. In other embodiments, the pipes 90 located on such a module could be shorter than the length of the module itself.

Figure 6:
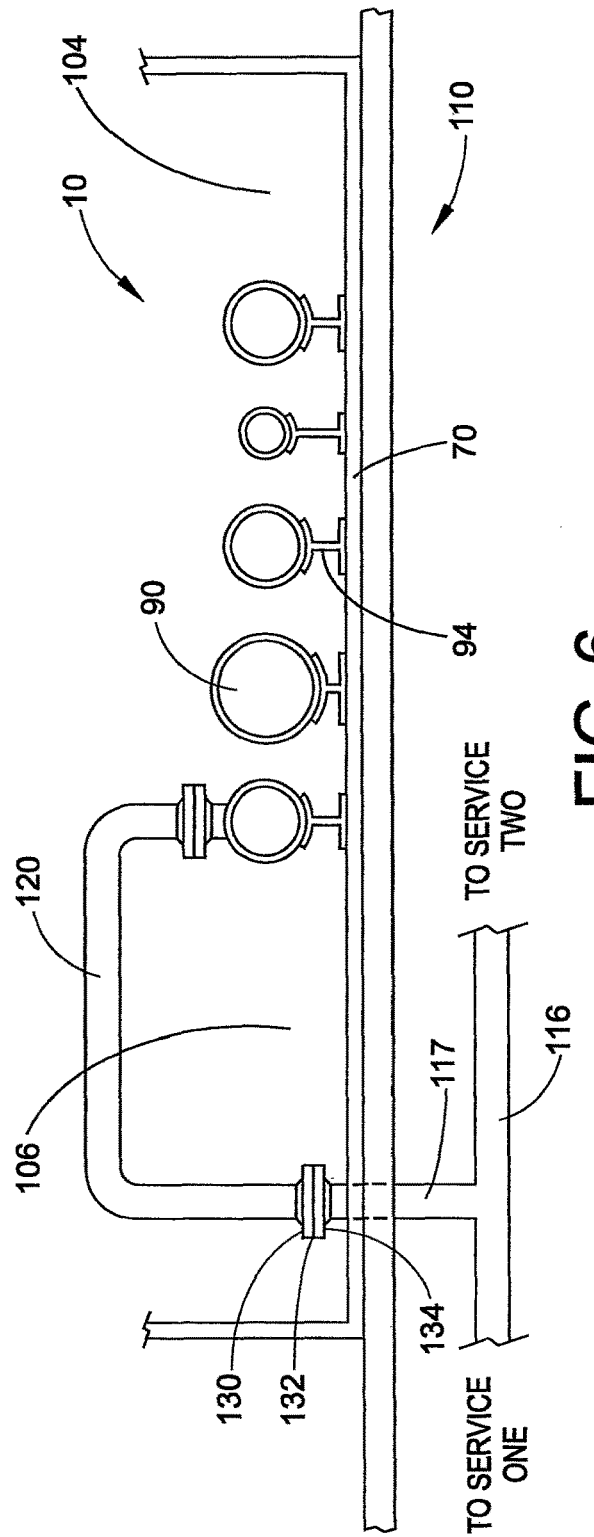
FIG. 6 is a schematic end elevational view of a pipe rack module having a single connector leaving the module to several services, and illustrating a piping alleyway.

In this embodiment, FIG. 6 illustrates a simplified diagram showing a single pipe to demonstrate the connection between the pipe rack module 10 and the one or more lower modules 110. A vertical riser 120 runs from a pipe 114 in the lower module 110 through the window/alleyway 104, 106 in order to connect the piping in the lower module to the pipe rack module 10. The riser 120 extends beyond the pipe rack level 70 of the pipe 90 that it will be connected to. It then elbows in a direction perpendicular to the pipe 90 going across as much of the width of the pipe rack module 10 as necessary. It will then elbow down and tie-in from above to the pipe 90 it is joining. As shown in FIG. 1C, the riser 120 is flanged as at 130 and is flush with the lower module/pipe rack module 110 at a junction 132. Where the riser 120 crosses the junction 132 it is connected to a flange 134 of a connector 117 of the pipe 116 located in the lower module 110.

In one embodiment, the primary pipes 90 are spaced somewhat away from the cross beams. Instead, they are supported on the cross beams by a support 94 as illustrated in FIG. 6. A variety of such supports are contemplated with the supports having different geometric configurations as may be needed for a particular installation.

The pipe rack module is a combination of concepts, facilitating the construction of a modular facility at a given location followed by disassembly and reassembly at a subsequent location. The pipe rack module disclosed herein is aimed at reducing the capital cost and construction schedule of a fluid processing facility, and at reducing the fixed location of a facility by designing the facility to be portable (disassemble from a location when that location has proven to be uneconomic or from lack of feedstock, and reassemble at a new location with better economics or feedstock availability).

Figure 5:
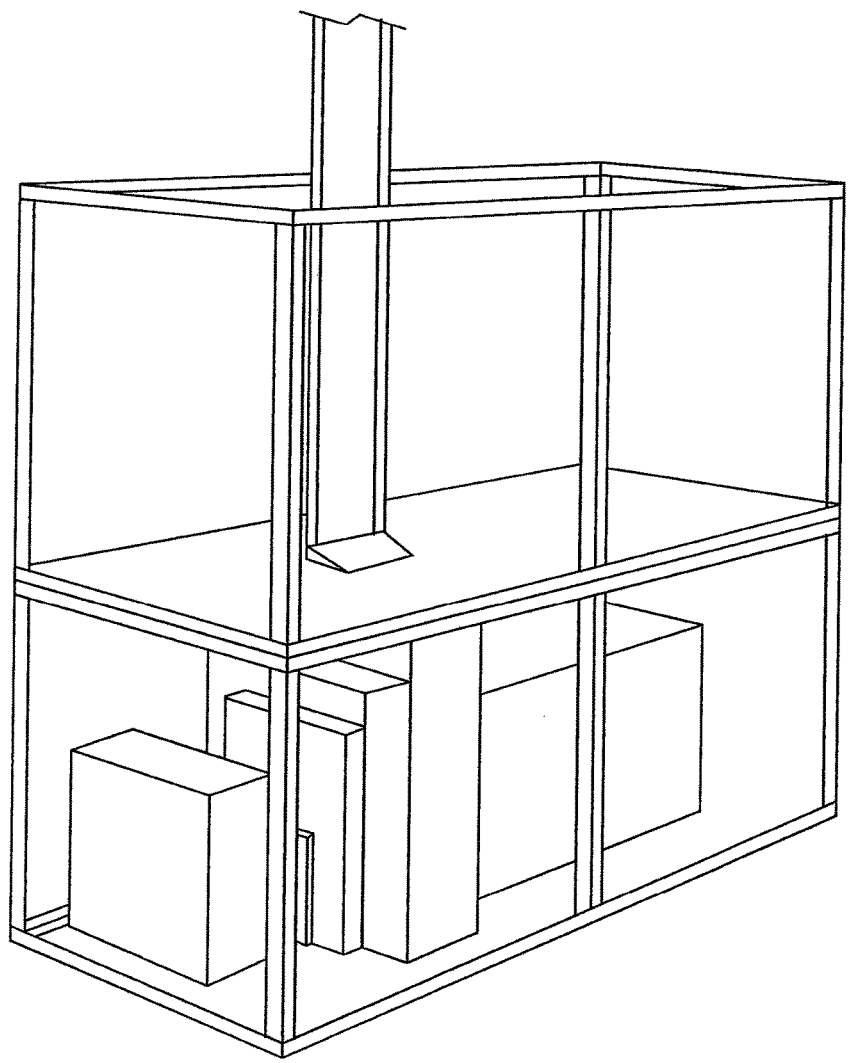
FIG. 5 is a schematic perspective view of one arrangement of a single piece of equipment spanning two stacked modules according to the present disclosure.

In one embodiment, the majority of the modules, including the heaviest modules are laid in an orientation substantially parallel to each other, as best seen in FIG. 2, and laid as the bottom layer of the facility. The modules are close-coupled with one module directly coupled to a neighboring module(s), if so desired. If required, for personnel or equipment access, a maintenance gap 118 can be provided between adjacent modules 110 as illustrated in FIG. 2. In one embodiment, the gap can be between about 6-12 feet wide. Modules, such as equipment modules 112 and 114 located on the second layer of the facility are generally smaller and lighter than the lower modules 110. As mentioned, these modules can run either parallel or perpendicular to the bottom layer of modules provided they have direct access to the pipe rack module (if running parallel to the pipe rack module, then upper modules 112 are limited to those directly adjacent to the pipe rack module except for those modules which do not require pipe rack connections. Modules 114 running perpendicular to the pipe rack modules are placed adjacent to the pipe rack module 10. Modules with a height higher than the height of one module (e.g. columns, boilers, equipment with stacks etc.) are designed as two stacked modules or as a horizontal module rotated to a vertical position at the facility location as shown in FIG. 5.

The pipe rack module 10 can be a module located on the second layer of modules, runs perpendicular to the bottom layer of modules 110, and can be placed near the center of the facility location. Placement of the pipe rack module is determined on a facility to facility basis, and if space is a concern, it is placed in a manner avoiding modules that are more than one module in height, and in conjunction with the layout of any modules (such as 112 and 114) located on the upper layer. Placement of the pipe rack module 10 on top of the first layer of modules 110 further utilizes the first layer of modules as structural support for one or several pipe rack modules.

Figure 11:
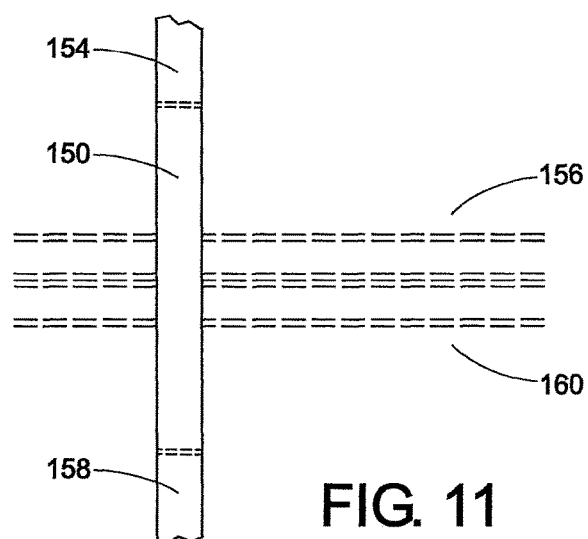
FIG. 11 is a schematic view of a pipe connection according to the prior art.
Figure 12:
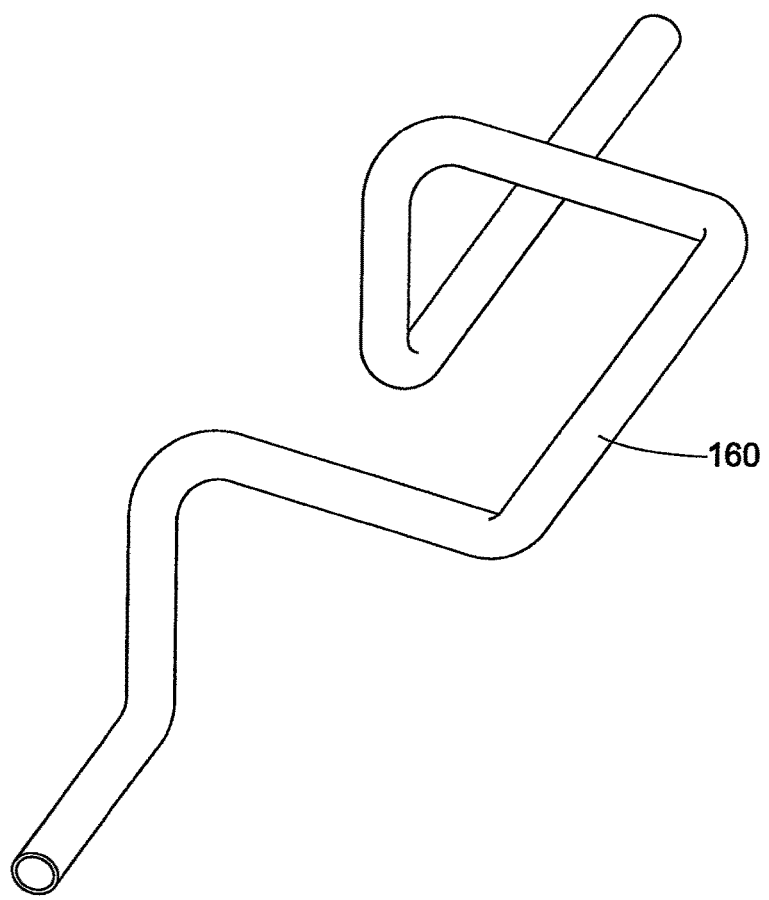
FIG. 12 is a schematic view of a pipe expansion loop according to the prior art.

Another aspect of the present disclosure pertains to the use of the module layout and the pipe rack module 10 of the present disclosure in order to shorten piping distances within the facility. One complication of pipe rack design is that fluids processing facilities generally have long runs/lengths of piping. These long lengths increase the impact of thermal expansion of hot or cold pipes such that expansion loops are typically required to maintain the piping stresses to within mechanical limits. These expansion loops, sometimes termed spools, require considerable effort to design into a standard, or especially a modular, pipe rack because the expansion loop requires vertical and horizontal space. FIG. 11 illustrates one such prior art spool connection. In this design, a spool 150 is welded to an upper pipe 154 of a first module 156 and also to a lower pipe 158 of a second module 160. It can be appreciated that disassembling such an installation is a very time consuming procedure, particularly when multiple such connections have been made initially and take up considerable vertical and horizontal space. Moreover, while the illustrated spool appears linear in FIG. 11, it is offset if the upper and lower pipes are not aligned. It can be appreciated that spools of a variety of geometric configurations may be necessary to accommodate thermal expansion concerns. One such three dimensional prior art spool or expansion loop 160 is shown in FIG. 12. The vertical and horizontal space requirements for such a loop are there shown. According to the instant disclosure, the shorter distances in the facility resulting from the modular design and close coupling of modules, including the pipe rack module, as discussed herein allows for substantially all piping to be run without expansion loops, spools and the like. For the exceptional line in which an expansion loop is required when employing the pipe rack module 10, the pipe with the expansion loop will be placed on the top level of the pipe rack module and will be orientated in a single vertical plane such that both ends lie in a single plane. Where possible, the expansion loop will be contained within the height limitation of the module. If required, the expansion loop may exceed the height limitation of the module, and would be connected in place when assembled in the first location.

Figure 10:
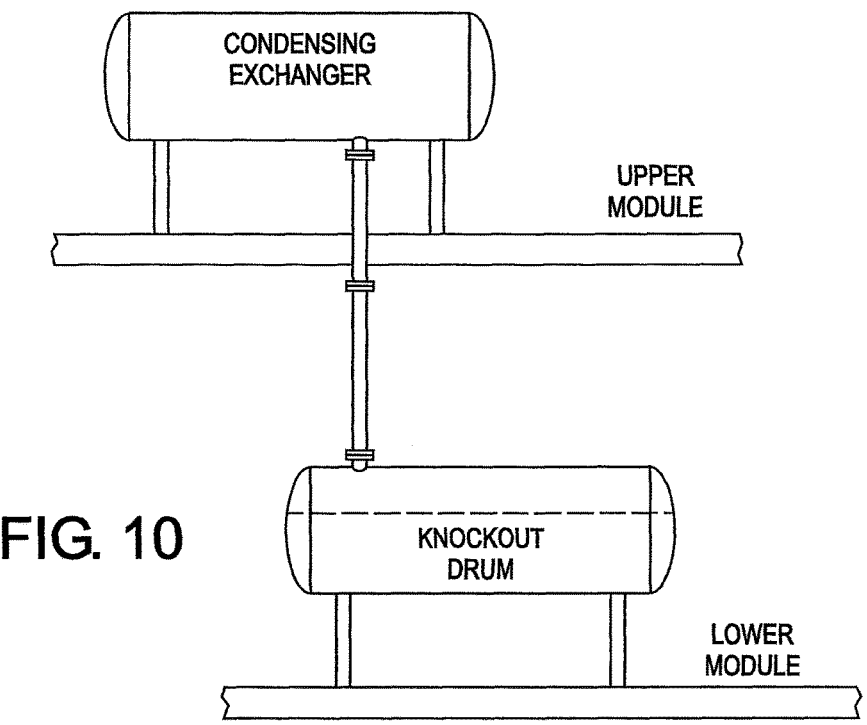
FIG. 10 is a schematic perspective view of two equipment modules directly connected to each other without going through the pipe rack module.

Piping contained within the given module, in this instance a lower module 110, is piped in a manner taking into account equipment spacing, operator and maintenance access, instrument access, other piping, and other typical (or standard) piping run constraints common in the industry. Piping that crosses a module boundary is generally piped parallel to the module until it reaches a point below the pipe rack module 10 to which it will be connected. One exception is with modules containing equipment or systems that span more than one module (e.g. boiler module or evaporator system) (See FIG. 5). The other exception is where there is a hydraulic constraint limiting the piping pressure drop between two modules which does not allow the piping to go via the pipe rack module (See FIG. 10). If a given service has multiple feeds or products to or from a given module, a single feed or product line will connect to the pipe rack module, with the split of feed lines or the combining of product lines occurring in the lower module (See FIG. 6).

Piping contained within the given module, in this instance an upper module (such as 112 or 114), is piped (oriented) in a manner taking into account equipment spacing, operator and maintenance access, instrument access, other piping, and other typical (or standard) piping run constraints common in the industry. Piping that crosses a module boundary is generally piped within the module until reaching a suitable place to connect to the pipe rack module 10. When the upper module is oriented parallel and adjacent to the pipe rack module (such as 112), then it is piped to the common boundary at a convenient location. When the upper module is oriented perpendicular to the pipe rack module (such as at 114), then piping is generally piped parallel to the upper module reaching a point by or above the pipe rack module to which it will be connected. One exception is with modules containing equipment or systems that span more than one module (e.g. boiler module or evaporator system) (See FIG. 5). The other exception is where there is a hydraulic constraint limiting the piping pressure drop between two modules which does not allow the piping to go via the pipe rack module (See FIG. 10). When a given service has multiple feeds or products to or from a given module, a single feed or product line will connect to the pipe rack module, with the split of feed lines or the combining of product lines occurring in the upper module (See FIG. 6).

Figure 4:
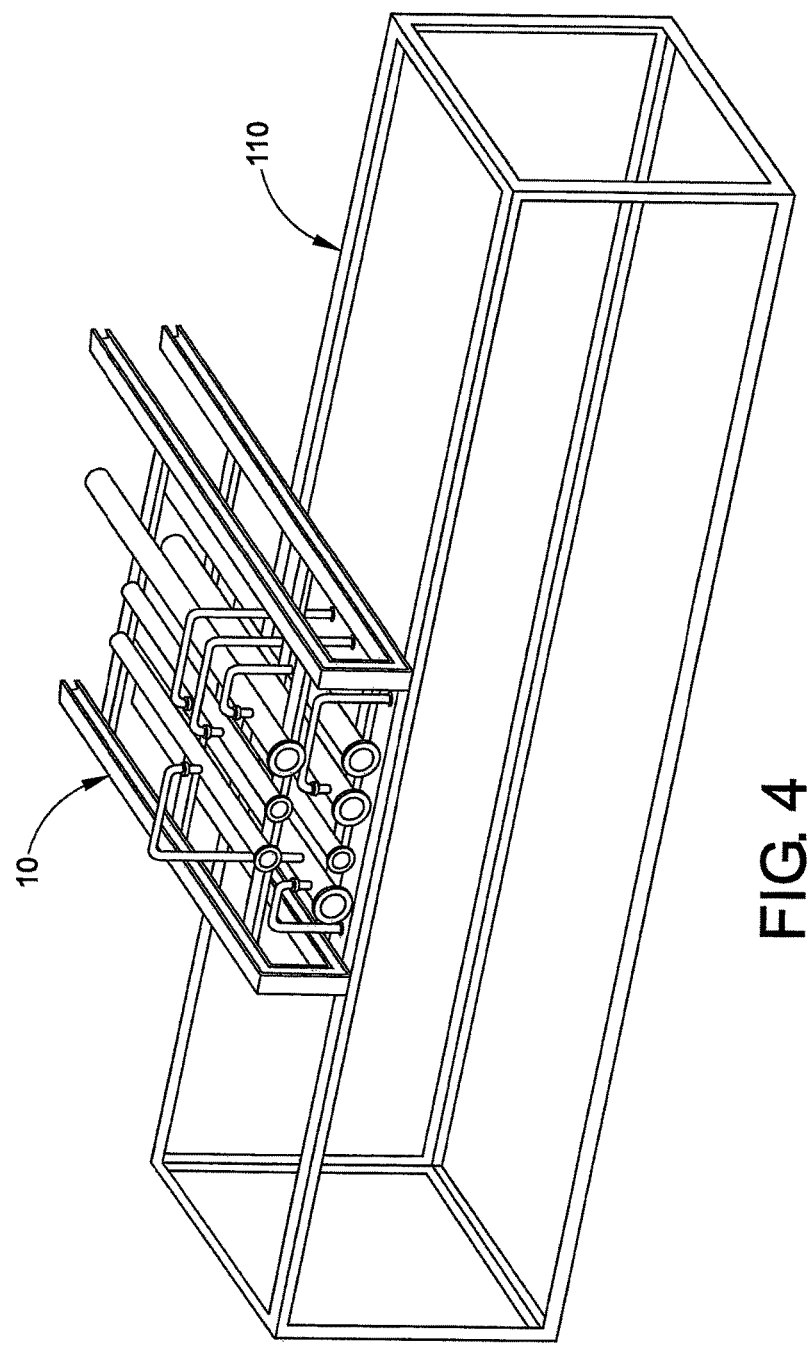
FIG. 4 is a perspective view of a pipe rack module positioned atop a lower module according to one embodiment of the present disclosure.
Figure 7:
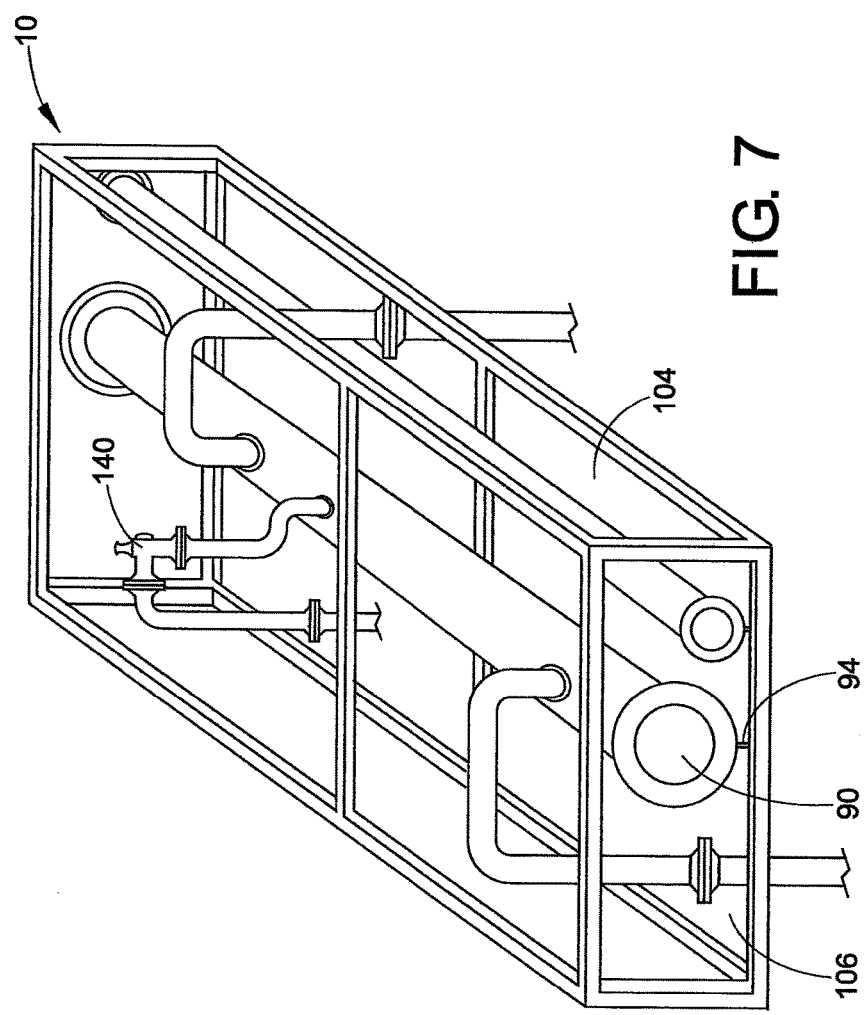
FIG. 7 is a schematic view of a pipe rack module with a Pressure Safety Valve (PSV) discharge line flare connection according to one embodiment of the present disclosure.

In one embodiment, the pipe rack module is the same width as the standard module in the facility. It is placed flush on top of the lower modules and in one instance run perpendicular to the lower modules (See FIGS. 2 and 4). The pipe rack module further includes a window or alleyway or space 104, 106, in one embodiment between about 1 to about 4 feet in width running substantially parallel to the pipe rack module on one and/or both sides of the module (FIGS. 1, 2 and 3). All piping, excluding connections run parallel to the module in the area of the module not taken up by the window or alleyway. When needed, multiple levels of piping are placed on the pipe rack, each level of which contains the same window(s). Standard piping guidelines are used to determine the location and spacing of each individual pipe line (e.g. the flare line is normally placed on the highest pipe rack module level) (FIG. 7).

Each connection to the pipe rack module to/from lower modules is made via a vertical riser 120 from the pipe (e.g., 116) in the lower module 110 through the window 104, 106 in the pipe rack module. This riser extends above the pipe rack level of the line (pipe) to be connected. With reference now again to FIGS. 1A and 1B, it can be seen that the vertical riser or connector pipe 120, 120' and 120" is configured so as to connect to its respective pipe 90 on the pipe rack module 10 and extends to the bottom surface 30 from its connection point to the respective pipe 90. In an embodiment, the riser 120 elbows substantially perpendicular to the line (pipe) 90 across as much of the width of the pipe rack module as needed. The riser then elbows down and ties-in (connects) to the line (pipe) it is connecting. More specifically, each riser 120 includes a first section 122 which is oriented generally vertically so that it extends above the pipe 90 to which it is connected. The riser also includes a second section 124 which is oriented generally horizontally and extends from its pipe to the nearest one of the passageways, alleyways or windows 104 or 106. The riser also includes a third section 126 which extends generally vertically downwardly so that it terminates in a flanged end located at the bottom surface 30 defined in the pipe rack 10. The riser 120 is preferably flanged flush to the lower module/pipe rack module junction where the riser crosses the junction such as is shown in FIG. 1C. When constructing the modules, the location of each of the connections to the pipe rack module may be specified to module vendors. On first assembly, there is a maximum of one field fit joint ensuring each connection fits properly. On subsequent reassemblies, after the modules have been moved, the connections to the pipe rack will line up and will only require bolting up a flange to reconnect the pipes of a fluid processing facility.

Figure 8:
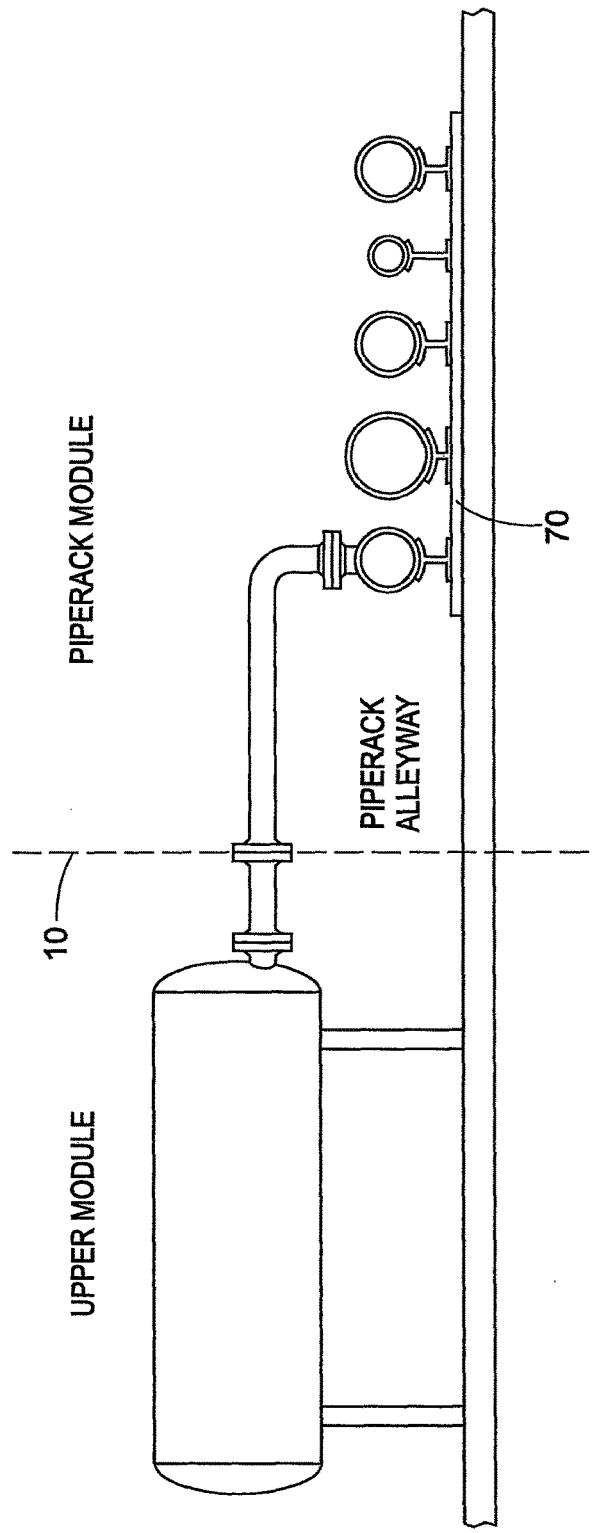
FIG. 8 is a schematic end elevational view of a pipe rack module connected to an upper equipment module according to one embodiment of the present disclosure.
Figure 9:
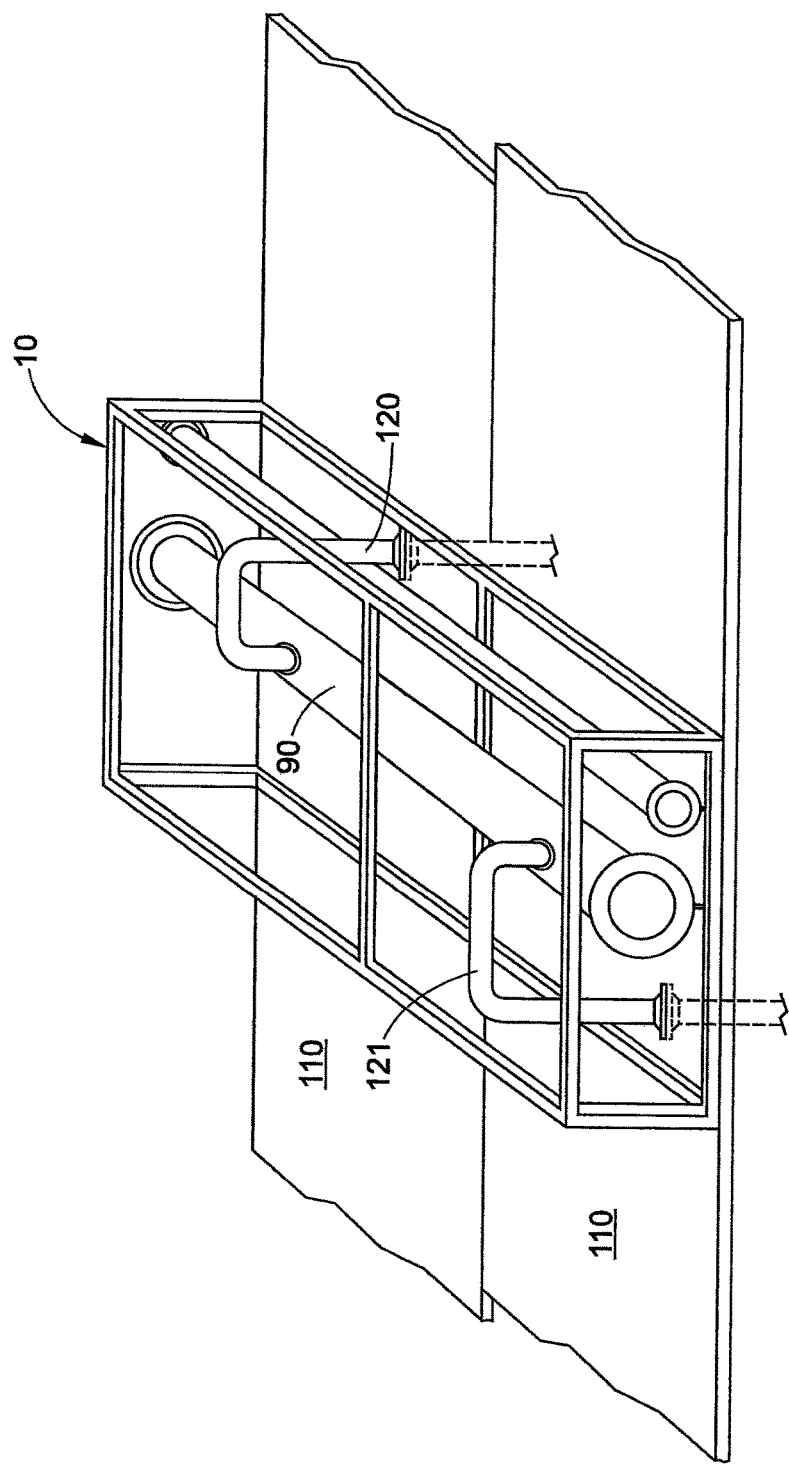
FIG. 9 is a schematic perspective view of a pipe rack module with a two separate service connectors from a single pipe according to one embodiment of the present disclosure.

Connections from the pipe rack module to/from the upper modules are done in a similar manner. One difference is that the connections may already be at or above the correct height to tie into the pipe rack module. When a connection is perpendicular or parallel to the pipe rack module, the connection from the upper module is placed at a given height (e.g. same height as the perpendicular leg of the lower pipe rack module for a given pipe rack level). The location of the tie point (in this instance widthwise on the module) is provided to the pipe rack module vendor to fix the coordinates of the tie point. As with the pipe rack/lower module tie points, there is a flange connection flush with the upper module/pipe rack module junction (FIG. 8).

In designing the pipe rack connections as described herein, the design of the main facility modules may be done independently. The pipe rack module vendor receives the location of each of the tie points required for the pipe rack module and then designs and constructs the pipe rack module accordingly. By making the module-to-module piping conform to this standard, the design and assembly of the standard modules, the assembly/disassembly/reassembly of the facility modules, and the installation of the pipe rack module is made simpler and faster.

The facility may require PSV (Pressure Safety Valve) protection with an associated flare header. Good process design requires such PSV valves 140 (see FIG. 7) to be located above the flare line and a non-pocketed discharge line from the PSV to the flare heater on lines where liquids may be discharged or condensed in the flare header (virtually every PSV). Depending on the number of PSV's and inlet/outlet lines into the pipe rack module, the PSV's are located in the pipe rack module window (parallel to the window) if room, or across the pipe rack upper level, perpendicular to the pipe rack module (if room is a constraint). In either case, the PSV's are located above the top level of the pipe rack module as part of the pipe rack module (preferable) or as part of the upper module ensuring necessary alignment of the PSV discharge piping to the flare header (See FIG. 7).

Instrument and electrical cable trays 100 run along the length of the pipe rack module 10. According to the present disclosure, the trays for the instrument and electrical cable runs follow a similar approach as piping runs to a module, as described herein.

Preferably, there is one connection for instrumentation and one connection for electrical between the pipe rack module and any given facility module. All other wiring and connections within the module are connected via a single connection. When assembling the facility, the only physical connection required for instrumentation and electrical, for a given facility module, is a single instrumentation connection and a single electrical connection. Correspondingly, when disassembling the facility in preparation for moving the module, only a single instrumentation and a single electrical connection are disconnected. This feature allows each facility module's instrumentation and electrical connections to be pre-commissioned at the module shop, resulting in higher productivity and reduced construction costs.

In some instances, more than one pipe rack module 10 may be required for a given facility. In this instance, an additional module(s) is placed head to tail with an existing pipe rack module. In a similar manner to module to pipe rack connections, the line connections between adjacent pipe rack modules will be flanged to facilitate the assembly/disassembly of the pipe rack modules. See FIG. 3A. Other than the pipe rack module to pipe rack module connection at the joint of two pipe rack modules, the two joined pipe rack modules behave as a single pipe rack module.

When there is a need and/or an opportunity to extend the pipe rack outside the boundaries of the modular facility, (e.g. extend the pipe rack to facilities such as a flare stack, product or feed storage, truck or rail loading, pipeline connections etc.) The pipe rack modules are connected either directly to the in-plant pipe rack modules as described above, or via risers on the pipes to raise or lower the line to the external pipe rack module. The risers and connections may be outside or inside of the modules depending on the particular facility.

Minimizing the number of field connections reduces costs by minimizing the amount of inefficient field work and maximizes the amount of work that can be completed in a controlled environment fabrication shop with a competitively priced labor force. Further, minimizing the connections cost provides the ability to quickly and cheaply relocate a complex processing facility.

As many changes can be made to the preferred embodiment of the disclosure without departing from the scope thereof; it is intended that all matter contained herein be considered illustrative of the disclosure and not in a limiting sense.

The invention claimed is:

1. A pipe rack module adapted to be connected to and disconnected from at least one associated equipment module that is located in a fluids processing facility, the module comprising:
   a substantially rectangular elongated frame having a longitudinal axis and including a plurality of connected framing members comprising horizontally oriented framing members which extend parallel to the longitudinal axis of the elongated frame, uprights, and cross-braces which extend normal to the longitudinal axis of the elongated frame wherein the plurality of framing members cooperate to define a top surface, a bottom surface, a first side surface and a second side surface of the frame, wherein the frame has a height, a width and a length;
   a pipe support defined by the frame, the pipe support comprising the cross-braces of the frame;
   a plurality of spaced primary pipes supported on the pipe support, wherein the plurality of primary pipes are each horizontally oriented and extend in a direction parallel to the longitudinal axis of the elongated frame and at least one of the plurality of primary pipes extends from a first end of the frame to a second end of the frame;
   a first passage defined between the first side surface of the frame and the nearest adjacent pipe;
   a second passage defined between the second side surface of the frame and the nearest adjacent pipe;
   at least one connector pipe comprising a first end and a second end, the first end being connected to an upper surface of one of the plurality of primary pipes and the second end, terminating at the bottom surface of the frame and comprising a flange adapted for connection to and disconnection from an associated pipe located beneath the frame; and,
   wherein the pipe support comprises a plurality of vertically spaced cross-braces defining at least two horizontally oriented and vertically spaced levels on which horizontally oriented primary pipes are supported.

2. The module of claim 1 wherein the pipe support further comprises a support member secured at a lower end to a cross-brace and at an upper end to one of the plurality of primary pipes.

3. The module of claim 1 further comprising a tray for accommodating an associated electrical or communication cable.

4. The module of claim 3 wherein the tray is supported on at least two of the cross-braces.

5. The module of claim 3 wherein the tray and at least some of the plurality of primary pipes are located in a common plane.

6. The module of claim 1 wherein a plurality of primary pipes each include a first pipe end and a second pipe end and wherein each end of each of the plurality of primary pipes further comprises a detachable connector for connection to an associated pipe.

7. The module of claim 6 wherein said detachable connector is flanged and requires no welding.

8. The module of claim 1 wherein the frame further comprises bracing members which extend between and are connected to spaced ones of the horizontally oriented framing members.

9. The module of claim 1 wherein the at least one connector pipe comprises a first section which is vertically oriented, a second section which is horizontally oriented and a third section which is vertically oriented.

10. The module of claim 9 wherein the at least one connector pipe third section extends in one of the first and second passages.

11. The module of claim 9 wherein the primary pipes comprise flanged first and second ends and, wherein the first and second ends of the primary pipes and the flange of the at least one connector pipe are so arranged that the respective flanges are located on three different sides of the module.

12. A pipe rack module adapted to be connected to and disconnected from at least one associated equipment module that is located in a fluids processing facility, the module comprising:
   a substantially rectangular elongated frame having a longitudinal axis and including a plurality of connected framing members comprising horizontally oriented framing members which extend parallel to the longitudinal axis of the elongated frame, uprights, cross-braces which extend normal to the longitudinal axis of the elongated frame and bracing members which extend diagonally in relation to the horizontally oriented framing members and connect a first horizontally extending framing member to a second horizontally extending framing member which is vertically spaced from the first horizontally extending framing member wherein the plurality of framing members cooperate to define a top surface, a bottom surface, a first side surface and a second side surface of the frame, wherein the frame has a height, a width and a length;
   a pipe support defined by the frame, the pipe support comprising the cross-braces of the frame;
   a plurality of spaced primary pipes supported on the pipe support, wherein the plurality of primary pipes each extend horizontally in a direction parallel to the longitudinal axis of the elongated frame and at least one of the plurality of primary pipes extends from a first end of the frame to a second end of the frame;

at least one connector pipe comprising a first end and a second end, the first end being connected to an upper surface of one of the plurality of primary pipes and the second end terminating at the bottom surface of the frame and comprising a flange adapted for connection to and disconnection from a pipe located beneath the frame.

13. The module of claim 12 wherein the pipe support comprises a plurality of vertically spaced cross-braces defining at least two levels on which horizontally oriented primary pipes are supported.

14. The module of claim 12 further comprising a tray for accommodating an associated electrical or communication cable.

15. The module of claim 14 wherein the tray is supported on at least two of the cross-braces.

16. The module of claim 12 wherein a plurality of primary pipes each include a first pipe end and a second pipe end and wherein each end of each of the plurality of primary pipes further comprises a detachable connector for connection to an associated pipe.

17. A pipe rack module assembly including an upper module adapted to be connected to and disconnected from a lower module that is located in a fluids processing facility, the module assembly comprising:

wherein the upper module comprises a substantially rectangular elongated frame having a longitudinal axis and including a plurality of connected framing members comprising horizontally oriented framing members which extend parallel to the longitudinal axis of the elongated frame, uprights, and cross-braces which extend normal to the longitudinal axis of the elongated frame wherein the plurality of framing members cooperate to define a top surface, a bottom surface, a first side surface and a second side surface of the frame, wherein the frame has a height, a width and a length;

a pipe support defined by the frame, the pipe support comprising the cross-braces of the frame;

a plurality of spaced primary pipes supported on the pipe support, wherein the plurality of primary pipes each extend horizontally in a direction parallel to the longitudinal axis of the elongated frame from a first end of the frame to a second end of the frame;

a plurality of support elements, each support element extending vertically upward from the pipe support, each support element spacing a respective one of the primary pipes vertically upward from the cross braces of the frame; and at least one connector pipe comprising a first end and a second end, the first end being connected to an upper surface of one of the plurality of primary pipes and the second end terminating at the bottom surface of the frame, the second end comprising a flange adapted for connection to and disconnection from a pipe located beneath the frame and supported by the lower module.

18. The module assembly of claim 17 wherein the pipe support comprises a plurality of vertically spaced cross-braces defining at least two levels on which primary pipes are supported.

19. The module assembly of claim 17 further comprising a tray for accommodating an associated electrical and/or communication cable.

20. The module assembly of claim 17 wherein the longitudinal axis of the upper module is oriented transverse to a longitudinal axis of the lower module.

* * * * *